J. G. ROBINSON.
RELIEF VALVE FOR STEAM SUPERHEATERS.
APPLICATION FILED AUG. 9, 1915.

1,217,504.

Patented Feb. 27, 1917.
5 SHEETS—SHEET 1.

FIG. 1.

INVENTOR
JOHN GEORGE ROBINSON
PER
ATTORNEY

J. G. ROBINSON.
RELIEF VALVE FOR STEAM SUPERHEATERS.
APPLICATION FILED AUG. 9, 1915.

1,217,504.

Patented Feb. 27, 1917.
5 SHEETS—SHEET 2.

INVENTOR
JOHN GEORGE ROBINSON
PER
ATTORNEY

J. G. ROBINSON.
RELIEF VALVE FOR STEAM SUPERHEATERS.
APPLICATION FILED AUG. 9, 1915.

1,217,504.

Patented Feb. 27, 1917.
5 SHEETS—SHEET 3.

Inventor:
John G. Robinson
by Herbert W. Jenner.
Attorney.

J. G. ROBINSON.
RELIEF VALVE FOR STEAM SUPERHEATERS.
APPLICATION FILED AUG. 9, 1915.

1,217,504.

Patented Feb. 27, 1917.
5 SHEETS—SHEET 4.

INVENTOR
JOHN GEORGE ROBINSON
PER
ATTORNEY

UNITED STATES PATENT OFFICE.

JOHN GEORGE ROBINSON, OF MANCHESTER, ENGLAND.

RELIEF-VALVE FOR STEAM-SUPERHEATERS.

1,217,504.  Specification of Letters Patent.  Patented Feb. 27, 1917.

Application filed August 9, 1915. Serial No. 44,587.

*To all whom it may concern:*

Be it known that I, JOHN GEORGE ROBINSON, a subject of the King of Great Britain and Ireland, residing at Manchester, in the county of Lancaster, England, (whose post-office address is Mere Bank, Fairfield, Manchester, in the county of Lancaster, England,) have invented certain new and useful Improvements in Relief-Valves for Steam-Superheaters; and I do hereby declare the following to be a full, clear, and exact description of the invention, such as will enable others skilled in the art to which it appertains to make and use the same.

Locomotives fitted with steam superheaters are liable to have accumulated a considerable quantity of steam and water in the superheater elements when the regulator is closed, such water being usually carried over by the steam from the boiler during the final action given to the regulator for completely closing it. From this water steam is generated and as there is no outlet toward the steam supply it follows that the water in the superheater elements will be converted into steam and pressure will be accumulated in the superheater, steam pipe line, steam chest and cylinders which will move the engine.

According to this invention, in order to prevent any such accumulation of steam pressure in the superheater, steam pipes, steam chests or cylinders when the regulator is shut, a relief valve is provided which is preferably operated from the regulator rod or handle so that by the action performed in closing the regulator the relief valve is immediately opened and vice versa by the action performed in opening the regulator the relief valve is immediately closed.

Further, the construction and arrangement according to this invention are preferably such that an operating connection between the regulator rod or handle and the above-mentioned relief valve is actuated so as to positively close the relief valve by the initial movement of the regulator rod or handle and the said relief valve is positively opened only by the final part of the movement given to the said rod or handle for completely closing the regulator.

The above-mentioned relief valve is preferably a double-beat valve and is preferably situated on the outside of the smoke-box wall or shell, the spindle of the valve projecting outside of the valve casing so as to be operated by an arm or lever connected with a rod which extends along the boiler to the foot-plate or cab of the locomotive where suitable means are provided for actuating the said rod so as to open and close, at the required times the relief valve by the movements given to the regulator rod or handle for respectively closing and opening the regulator as above-mentioned.

In conjunction with or in addition to the above-mentioned relief valve apparatus there is preferably also provided a combined blower and steam circulating valve whereby, when the engine is running or standing with the regulator closed, a predetermined amount of steam can be admitted to the superheater such steam, after circulating through the superheater elements or pipes, escaping to atmosphere through the above-mentioned relief valve. One of the objects of thus causing steam to circulate through the superheater when the regulator is closed is to prevent over-heating of the superheater pipes, thus doing away with the usual mechanical dampers or the steam jet draft retarders heretofore generally employed for preventing overheating of the superheater pipes when the regulator is closed. It is to be understood, however, that the provision of this combined blower and steam circulating valve, is not essential to the main features of the present invention because the above-mentioned relief valve apparatus will perform its pressure relieving functions whether or not the combined blower and circulating valve is provided.

Further features of the apparatus according to this invention will appear from the following description with reference to the accompanying drawings in which,—

Like reference numbers indicate corresponding parts in the several figures of the drawings.

Figure 1:
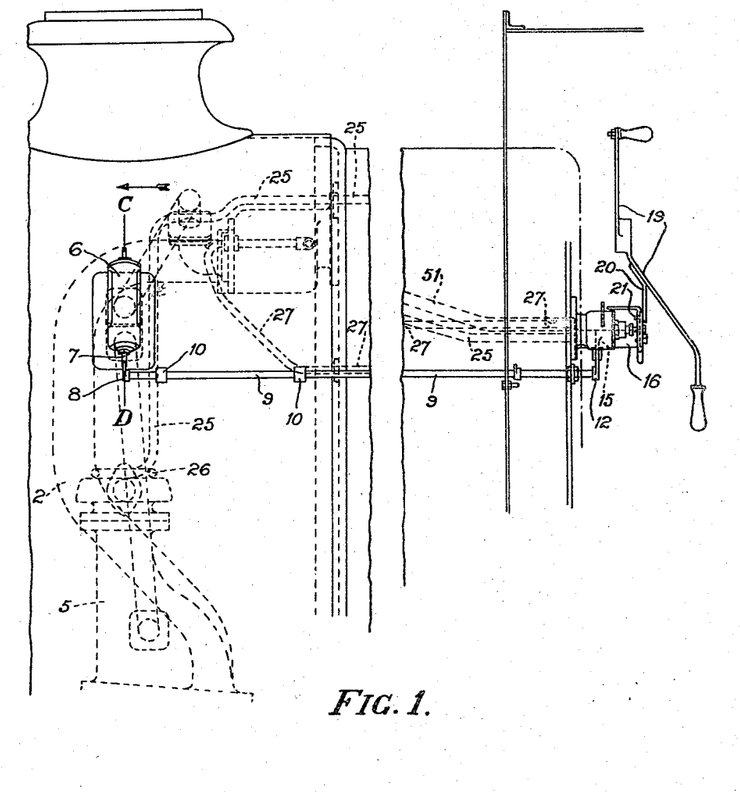
Figure 1 shows, in elevation, a locomotive boiler fitted with apparatus according to this invention.
Figure 2:
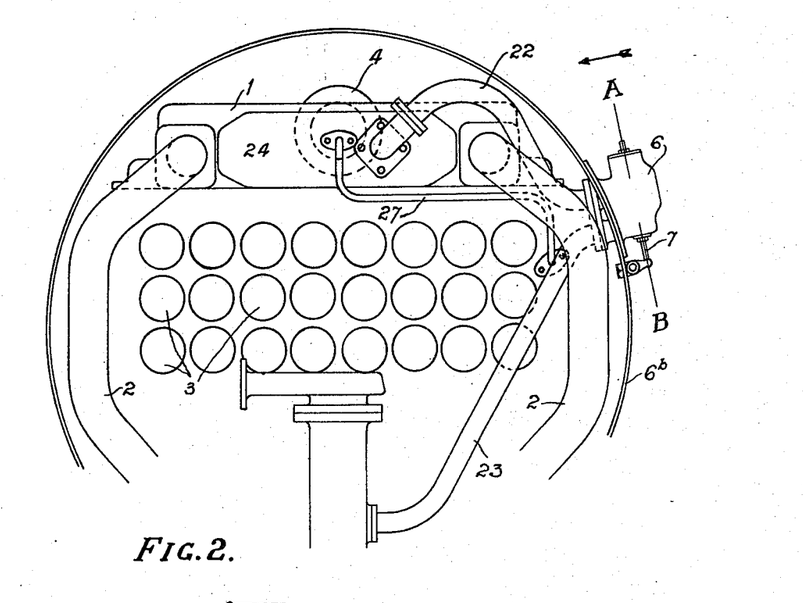
Fig. 2 is an elevation of the smoke-box with the front or door thereof removed, and shows the relief valve with its pipe connections to the superheater header and to exhaust as hereinafter described.
Figure 3:
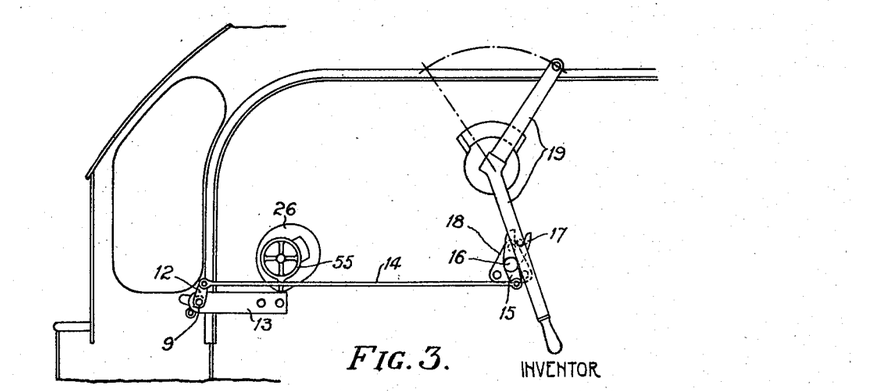
Fig. 3 is an elevation of the fire-box backplate or wall in the cab of the locomotive, and shows the regulator lever or handle and the operating connections therefrom to the relief valve as hereinafter described.

Referring to Figs. 1 and 2, 1 is a header of a steam superheater which may be of a known kind, the said header being, as shown, located in the smoke-box of the locomotive such header as usual comprising a chamber or chambers for saturated steam and a chamber or chambers for superheated steam. 2 are the usual main steam pipes leading from the superheated steam chamber or chambers of the header to the cylinder valve chests of the engine. 3 are the usual enlarged smoke-tubes of the boiler into which the superheater pipes or elements (not shown) extend such pipes or elements having their steam inlet and outlet ends respectively connected in the known or any suitable manner to the saturated and superheated steam chambers in the header. 4 is the usual tubular flange connection on the header through which steam from the saturated steam pipe of the boiler passes into the saturated steam chamber or chambers of the header. 5 is the usual blast pipe in the smoke-box through which the exhaust steam from the engine cylinders passes to the chimney. 6 (Figs. 1 and 2) is the hereinbefore mentioned relief valve which in the example shown is mounted in an approximately vertical position on the outside of the smokebox wall or shell 6ᵇ, for instance by means of a flange 6ᵃ formed on the valve casing and bolted to the smokebox shell. 7 is the operating spindle of the relief valve within the casing 6 and 8 is an arm or lever fixed on the end of a rod 9 which extends along the boiler, as shown in Fig. 1, and is rotatable in suitable bearings or brackets 10 on the outside of the boiler. As shown the rod 9 extends into the cab of the locomotive to a short distance beyond the fire-box back-plate or wall 11 and at this end the said rod 9 has secured to it a half-crank or lever 12. 13 is a suitable plate or bracket secured to the fire-box wall 11 the end of the rod 9 working in a suitable hole or bearing provided in the outer end of the said plate 13. 14 is a rod which, as shown in Fig. 3, is connected at one end to the arm or lever 12 on the rod 9 and at its other end is connected to an arm or half-crank 15 on the boss 16 on which is also formed or secured another arm or lever 17 which as shown is bifurcated at its upper or free end. As shown the boss 16 on which the arms or levers 15 and 17 are provided is rotatably mounted on a suitable spindle or shaft which at its inner end is secured for instance by the flange 18 to the firebox back-plate or wall 11. 19 is the regulator lever or handle which is of known kind for operating the usual or any suitable regulator valve controlling the main steam supply from the boiler to the superheater and engine. 20 is an arm or projection on the regulator lever 19 the said arm or projection carrying a pin 21 (which itself may carry an anti-friction roller) the said pin 21 in the position of the regulator lever shown, which corresponds to the fully closed position of the regulator valve, lies between the arms of the bifurcated lever 17. 22 (Figs. 1 and 2) is a pipe connection from the superheated steam chamber or chambers of the header 1 to the inlet port in the casing of the relief valve 6. 23 is a pipe connection from the outlet port in the casing of the relief valve 6 to the usual blast pipe 5. Although the pipe 22 as shown is placed in communication with the superheated steam chamber or chambers of the header 1 by being connected to the front wall or cover plate 24 of the header it will be understood that this connection might be otherwise conveniently made. 25 (Fig. 1) is the usual steam pipe from the boiler to the usual blower ring 26 in the smokebox, the said pipe. as shown in Fig. 1 extending through the boiler to the fire-box back-plate or wall 11 and being there connected to a port in the casing of the hereinbefore mentioned combined blower and circulating valve device 26 (Figs. 3 and 7). 27 (Figs. 1, 2 and 7) is the steam circulating pipe through which steam is admitted to the saturated steam chamber or chambers of the superheater header, by the operation of the combined blower and circulating valve 26, when the regulator is closed; this pipe 27 as shown in Fig. 1 extends through the boiler to the fire-box back-plate or wall 11 and is there connected to a port in the casing of the combined blower and circulating valve 26. Although communication between the circulating pipe 27 and the saturated steam chamber or chambers of the header 1 is, in the example shown, made through the front wall or cover-plate 24 of the header this connection might be otherwise conveniently made.

Figure 4:
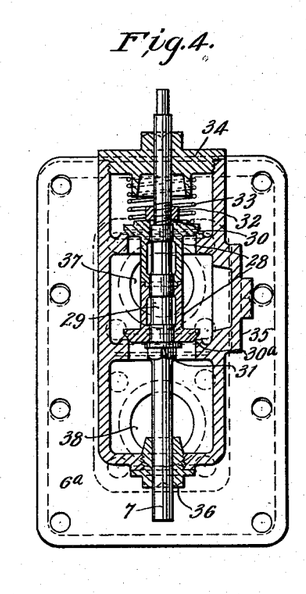
Fig. 4 is a sectional elevation of the relief valve taken on the line A—B (Fig. 2) looking in the direction of the arrow.
Figure 5:
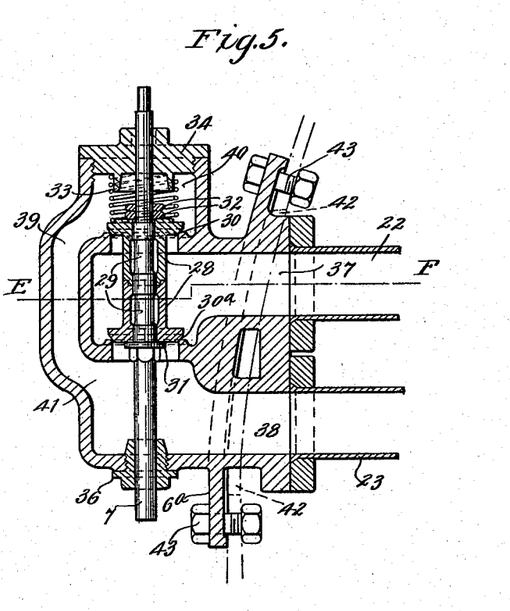
Fig. 5 is a sectional elevation of the relief valve taken on the line C—D (Fig. 1) looking in the direction of the arrow.
Figure 6:
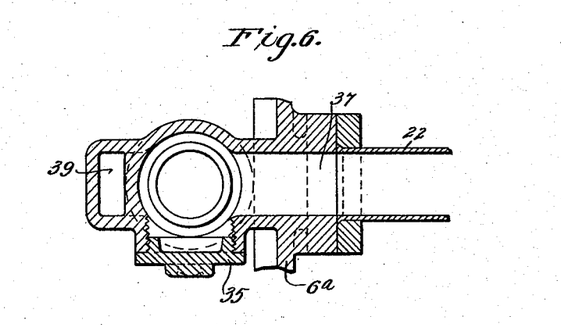
Fig. 6 is a sectional plan view of the relief valve casing only taken on the line E—F (Fig. 5).

As shown in Figs. 4 and 5 the relief valve consists of a double beat valve 28 which is preferably as shown made in two parts mounted on the central portion 29 of the valve spindle 7, the valve heads of this double beat valve being each provided with a coned valve face 30, 30$^a$ (Figs. 4 and 5) the said faces being adapted to seat on correspondingly formed valve seats within the valve casing. As shown the two portions of the valve 28 are secured together against longitudinal movement relatively to the valve spindle 7 by means of a collar 31 on the valve spindle against which the lower head of the valve is held by means of a nut 32 screwed up on the valve spindle against the upper head of the valve. 33 is a suitable spring which presses the valve heads with their conical faces 30, 30$^a$ on the valve seats within the casing thus holding the valve in the closed position. 34 is a screw cap in the upper end of the valve casing through which the valve spindle works. By removing the cap 34 access can be readily obtained to the upper portion of the double beat valve 28 and this portion of the valve can be readily inserted in and removed from the valve casing. 35 is a screw cap provided in one side of the valve casing and when the said cap is removed access can be readily had to the lower portion of the double-beat valve and this portion of the valve can be readily inserted in or removed from its position in the valve casing. As shown the lower end of the valve spindle 7 works through a suitable bush or gland 36 screwed into the end of the valve casing. 37 is the steam inlet port in the casing of the relief valve device 6 to which port the steam pipe 22 (Fig. 2) leading from the superheated steam chamber or chambers of the header is connected, and 38 is the steam outlet or exhaust port in the casing of the relief valve 6 to which port the outlet or exhaust pipe 23 is connected at one end the other end of the said pipe 23 being connected in any convenient manner with the usual exhaust or blast pipe 5 as shown in Figs. 1 and 2. 39 (Figs. 5 and 6) is a passage formed in the valve casing and forming communication between the chambers 40 and 41 in the valve casing.

As shown in Fig. 5 the casing of the relief valve is preferably so formed that the portion thereof to which the above-mentioned steam pipe 22 and exhaust pipe 23 are connected projects through a suitable opening 42 (Fig. 5) in the smokebox shell or wall to which the flange 6$^a$ on the valve casing is as hereinbefore mentioned secured by means of the bolts 43.

Figure 7:
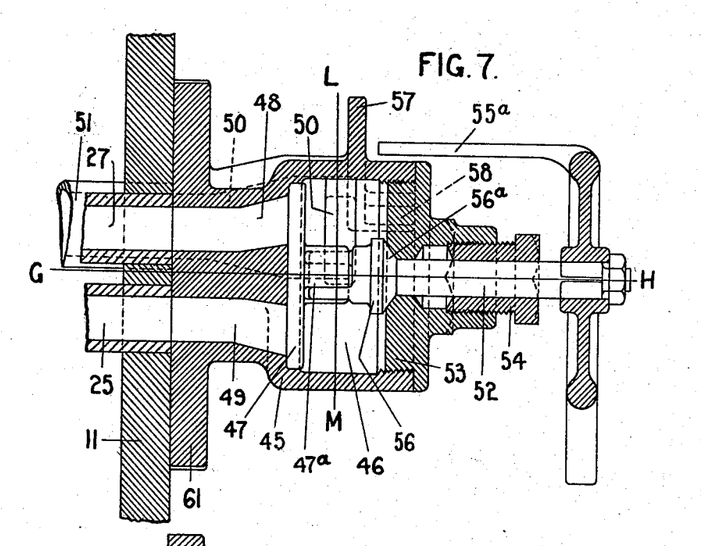
Fig. 7 is a sectional elevation of the combined blower and steam circulating valve hereinafter described.
Figure 8:
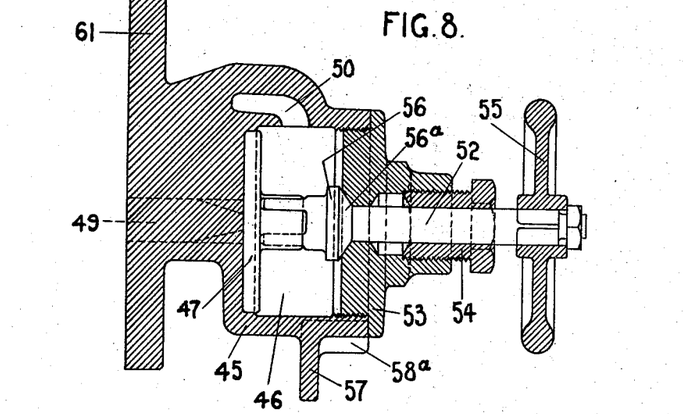
Fig. 8 is a sectional plan of the combined blower and circulating valve taken on the line G—H (Fig. 7).
Figures 9, 10, 11, 12:
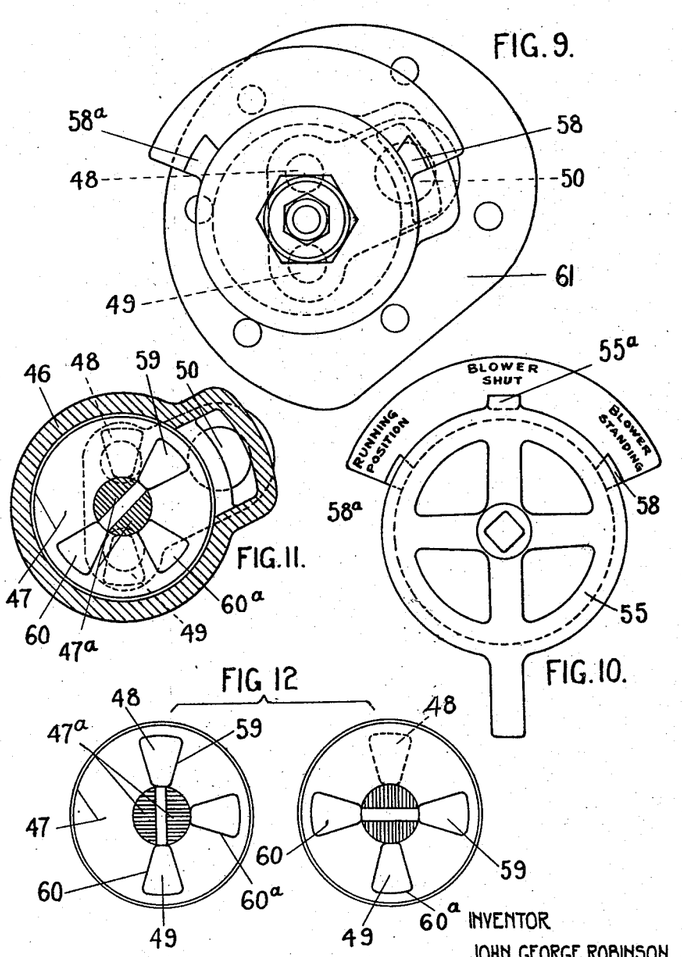
Fig. 9 is a front elevation of the combined blower and circulating valve with the valve operating handle removed.
Fig. 10 is a front elevation of the combined blower and circulating valve operating handle and also shows the hereinafter described flange with stops for limiting the movements of the valve.
Fig. 11 is a sectional elevation of the valve casing taken on the line L—M of Fig. 7.
Fig. 12 is a front elevation of the valve and valve seat shown in Figs. 7, 8 and 11, showing different positions of the valve as hereinafter described.

Referring now to Figs. 7 to 12 inclusive which show details of the hereinbefore mentioned combined blower and steam circulating valve device 26, 45 is the casing of this valve device within which is formed the chamber 46. 47 is a disk valve rotatable within the chamber 46 upon the valve seat formed at the outer ends of ports 48 and 49 to which are connected respectively the hereinbefore mentioned steam circulating pipe 27 and the blower pipe 25. 50 is a port formed in the body of the valve casing 45 the said port having connected to its inner end a pipe 51 (Fig. 1) which receives steam from the steam dome or steam space of the boiler so that steam is constantly admitted through the said pipe 51 and port 50 into the chamber 46 in the valve casing, steam thus acting to constantly press the valve 47 on its seat. As shown in Figs. 7 and 8 the disk valve 47 is provided with a short slotted or bifurcated stem 47$^a$ with which the suitably shaped inner end of the valve operating spindle 52 engages the said spindle extending through the screw cap 53 in the outer end of the valve casing and through a suitable packing gland 54 in the said screw cap. On the outer end of the operating spindle 52 a suitable operating handle 55, which as shown is in the form of a wheel, is secured, the said handle as shown in Fig. 7 having a projecting arm 55$^a$ which acts, in conjunction with the stops hereinafter described, to limit the movements of the valve. Adjacent the inner end of the valve operating spindle 52 a collar 56 is provided on the said spindle this collar having formed on it a conical face 56$^a$ which bears against a correspondingly formed seat on the inner side of the above-mentioned screw cap 53. As the steam within the chamber 46 can act on the inner side of the collar 56 and on the inner end of the valve spindle 52 the valve spindle will consequently be forced outwardly with the conical face 56$^a$ tight against the corresponding seat on the screw cap 53 thus further insuring a steam-tight arrangement. 57 is a flange in the form of a segment formed on the outside of the valve casing 45 and 58, 58$^a$ are projections or stops formed at opposite ends of the said flange and with which stops the hereinbefore mentioned arm 55$^a$ on the valve operating handle coöperates for limiting the movements of the valve. As shown in Fig. 10 the flange 57 has suitably marked on it words indicating the conditions existing according to the different positions of the valve. The outer ends of the ports 48, 49 are preferably formed as shown in Figs. 11 and 12. The disk valve 47 has formed in it openings or ports 59, 60 and 60ª (Fig. 12), the ports 59 and 60 being adapted, when the valve 47 is operated as hereinafter described, to register with the ports 48 and 49 so as to admit steam through the pipes 27 and 25 respectively to the superheater and blower, the port 60ª being also adapted to register with the port 49 to supply steam to the blower only as hereinafter described. 61 (Figs. 7, 8 and 9) is a suitable flange by means of which the above described combined blower and circulating valve device is suitably secured, for instance by means of studs and nuts, to the fire-box back-plate or wall 11.

The working of the hereinbefore described relief valve apparatus is as follows:—

Referring to Figs. 1 and 3, assuming the operating lever or handle 19 of the regulator valve, for controlling the main steam supply to the superheater and engine, to be in the full line position which corresponds to the closed position of the regulator valve, in this position of the regulator handle and valve the relief valve device 6 (Fig. 1) has been actuated so that the double beat valve 28 (Figs. 4 and 5) is in the open position with its valve faces 30, 30ª off the valve seats in the valve casing, this actuation of the relief valve having been effected in the following manner:—During the final part of the movement of the regulator handle or lever 19 from the dotted line position, which corresponds to the full open position of the regulator valve, the pin 21 carried by the regulator handle 19 comes against the left-hand prong or arm of the bifurcated lever 17 whereby the said lever with its boss 16 and the lever 15 are turned, in an anti-clockwise direction, to the full line position shown and the rod 14 is consequently pulled or moved to the right so that the lever 12 and with it the rod 9 are turned in a clockwise direction (as viewed in Fig. 3) and by this movement of the rod 9 the arm or lever 8 on the opposite end thereof (see Fig. 2) is turned upwardly and by this movement pushes the valve spindle 7 upwardly so as to move the double-beat valve 28 (Figs. 4 and 5) into the open position as above-mentioned i. e. with the valve faces 30, 30ª off their seats in the valve casing. With the relief valve in the open position as just described any pressure that might arise in the superheater, steam pipes, engine steam chests or cylinders when the regulator is shut (for instance due to water that may have been carried over into the superheater elements or pipes being converted into steam as hereinbefore mentioned) will escape from the superheater header 1 (Figs. 1 and 2) through the pipe 22, port 37 in the relief valve casing, past the valve face 30ª into the chamber 41 (Figs. 4 and 5) through the escape pipe 23 into the blast pipe 5, whence the steam escapes through the chimney to atmosphere. The steam entering the valve casing through the pipe 22 also flows past the valve face 30 and through the passage 39 and chamber 41 into the escape pipe 23.

From the foregoing it will be seen that the movement given to the regulator handle for completely closing the regulator valve, so as to shut off the supply of steam to the engine, positively actuates the relief valve so as to open the said valve and allow any pressure that may have accumulated or that may arise in the superheater, steam pipes, engine valve chests and cylinders to escape to atmosphere. It will be understood that the friction and weight of the regulator lever 19 and the parts operatively connected therewith are sufficient to hold the relief valve in the open position while the regulator valve is in the closed position.

Now assuming that the regulator lever 19 is moved from the full line position (closed position of regulator) to the dotted line position (Fig. 3), by the first portion of the movement given to the regulator lever 19 the pin 21 carried thereby will strike the right-hand prong or arm of the bifurcated lever 17 so that the said lever 17 and with it the boss 16 and lever 15 will be turned in a clockwise direction whereby the rod 14 is pushed or moved toward the left and the arm or lever 12 and rod 9 are consequently turned, in an anti-clockwise direction, so that the arm or lever 8 (Fig. 2) is turned downwardly; when this downward movement of the arm 8 takes place the double-beat valve 28 (Figs. 4 and 5) moves downwardly, by the action of the spring 23 and gravity, into the closed position, i. e. with the valve faces 30, 30ª on the valve seats in the valve casing as shown in Figs. 4 and 5. By this movement of the double-beat valve 28 communication between the pipe 22 and the escape pipe 23, through the ports and passages in the relief valve casing, is shut off so that steam admitted to the superheater, steam pipes, engine valve chests and cylinders, by the opening of the regulator for driving the engine, cannot escape to atmosphere through the relief valve and pipe 23.

The construction and arrangement of the above-mentioned double-beat relief valve 28 as shown in Figs. 4 and 5 is such that the live steam which passes from the superheater header through the pipe 22 into the valve casing (when the regulator is open) acts on an area of the lower end or head of the valve which is slightly larger than the area of the upper end or head on which the steam also acts, and thus assists the spring 33 in maintaining the valve in the closed position.

When the engine is working a train on the level or on a slightly falling gradient, to maintain speed it is necessary to have the steam regulator open a small amount, and to insure none of the steam being passed to atmosphere through the superheater relief valve device 6 it is necessary that the relief valve should, as hereinbefore described, be immediately closed by the initial part of the opening movement of the regulator. Further when running under normal conditions with the regulator open it is very desirable that the contents of the superheater should not be relieved until the regulator is finally closed otherwise if the relief valve were gradually opened during the closing movement of the regulator there would be great waste of steam which would go to atmosphere through the relief valve until this valve is finally closed. Waste of steam would also occur if the relief valve were gradually closed during the opening movement of the regulator, and the starting up of the engine would be retarded, until the relief valve had completely closed. These objections are entirely obviated by means of the apparatus according to this invention in which the relief valve is, as hereinbefore described, closed by the initial part of the movement given to the regulator for opening the same and the said valve is opened by the final part of the movement given to the regulator for closing the same.

Further with the apparatus according to this invention it is insured that the relief valve is opened at the required times, which is not the case with previously proposed valves which have been operated independently of the engine regulator.

The working of the hereinbefore described combined blower and steam circulating valve is as follows:—

With the operating handle 55 of the valve 47 in the position shown in Figs. 7 and 10 communication between the valve chamber 46 (which as previously described is constantly supplied with steam from the boiler or steam dome through the port 50) and the ports 48 and 49 leading respectively to the superheater and blower are shut off. When the regulator controlling the supply of steam from the boiler to the superheater and engine is shut, and it is desired to supply steam only to the blower ring 26 (Fig. 1) the driver turns the operating handle 55 (Figs. 7 and 10) in a clockwise direction until the arm 55ª comes against the stop 58 (Figs. 7, 9 and 10) whereby the disk valve 47 is turned to the position in which the port or opening 60ª in the said valve registers with the port or passage 49 whereupon steam passes from the chamber 46 through the ports 60ª and 49 and through the pipe 25 to the blower ring 26 thus bringing the blower into action. If, in addition to supplying steam to the blower, it is also desired to simultaneously cause steam to circulate through the superheater when the regulator is closed, as when the engine is coursing, the driver then turns the operating handle 55 of the disk valve 47 until the arm 55ª on the handle comes against the stop 58ª whereby the disk valve 47 is turned to the position in which the port 59 in the valve registers with the port or passage 48 and the port 60 in the valve at the same time registers with the port or passage 49 whereupon steam will pass from the valve chamber 46 through the said ports and passages the steam passing through the port 48 in the valve casing going into pipe 27 and through the said pipe into the superheater header 1 (Figs. 1 and 2) and the steam at the same time passing through the port 49 going into the pipe 25 and to the blower ring 26. The steam which passes through the pipe 27 into the superheater header 1 passes from the saturated steam chamber or chambers of the header through the superheater elements or pipes into the superheated steam chamber or chambers of the header and from which point it is sucked, by the pumping action of the engine pistons, through the steam pipes 2, 2 into the cylinder steam chests and cylinders whence it goes to exhaust through the blast pipe 5.

In the event of the combined blower and circulating valve being inadvertently placed in the open position, while the engine is standing, the steam passing from the circulating valve device 26 through the superheater will not actuate the engine because the steam thus circulated will pass to atmosphere through the pipe 22, in connection with the casing of the hereinbefore described relief valve device 6, whence it passes through the escape pipe 23 and the blast pipe 5 to atmosphere, the relief valve being as hereinbefore described, in the open position when the regulator is closed.

The ports in this valve are so formed and arranged that when the engine is coursing, the steam regulator being closed, simultaneously with the opening of the ports for supplying steam to the blower steam is admitted to the saturated steam chamber or chambers of the header, and as the quantity of steam to the blower is increased so the volume of steam is increased that is admitted to the saturated side of the header thus neutralizing the increased temperature produced in the superheater pipes by the increased vacuum produced in the smoke-box by the blower. Therefore as the temperature of the superheater pipes is increased by the action of the blower a larger volume of steam is circulated through the superheater pipes to prevent their overheating.

In conjunction with the steam circulating apparatus comprising the combined blower and circulating valve 26 there is fitted to each cylinder steam chest of the engine a suitable air inlet or snifting valve of the usual type. The steam admitted to the superheater through the combined blower and circulating valve on passing through the superheater is increased in temperature and this high temperature steam on entering the steam chest is mixed with air admitted through air inlet or snifting valves thereby reducing the temperature of the steam. The air inlet valves should be of such area as to admit sufficient air which in conjunction with the circulating steam effectively prevents any vacuum being formed in the steam chests or cylinders. This mixture of air cooled circulating steam entering the valve chests and cylinders causes diffusion or emulsification of the cylinder lubricating oil and effectively maintains the lubricating properties of the oil. By effectively preventing the formation of any vacuum in the steam chests or cylinders, by means of the circulating steam and the air admitted through the air inlet or snifting valves, suction does not take place in the pipe line 23 in connection with the blast pipe 5 and superheater relief valve device 6 (Fig. 2); consequently smoke box gases are not drawn through the blast pipe 5 and pipe line 23 into the relief valve 6 and carbonization of the pipe line 23 and the relief valve 6 is thus prevented.

The construction and arrangement of the hereinbefore described relief valve apparatus are such that the apparatus is practically balanced in operation so that the operation of the relief valve by the movements given to the regulator handle requires practically no extra force or effort by the driver than is required for operating the regulator valve alone.

With the apparatus according to this invention objectionable noise, due to steam escaping through the relief valve, is avoided owing to the connection of the escape pipe 23 to the blast pipe 5.

I wish it to be understood that the present invention, in its main features, is not limited to the particular construction and arrangement of the relief valve 6 and the operating connections thereto from the regulator as hereinbefore described and shown in the accompanying drawings, as other constructions and arrangements might be employed without departing from the invention. For instance the construction and arrangement might be such that the final portion of the movement given to the regulator valve, for closing same, will actuate a steam cock or valve so as to admit steam to one side or area of a steam operated relief valve (or to one side or area of a piston for operating a relief valve) thereby moving the relief valve into its open position so as to place the superheater, steam pipes, engine valve chests and cylinders in communication with the atmosphere as hereinbefore described; and, on the other hand, the initial or first portion of the movement given to the regulator valve for opening the same will actuate the above-mentioned steam cock so as to place the aforesaid side or area of the relief valve (or its operating piston) to exhaust and at the same time admit steam to the opposite side or area of the said relief valve or piston whereby the relief valve will be moved into its closed position. The above-mentioned steam cock (for admitting steam to the relief valve for actuating the same) might be actuated by means of mechanical connections to the regulator lever or handle 19 substantially as hereinbefore described with reference to the drawings, or some other suitable device operable by the regulator handle 19, or by the movements given to the regulator valve itself, might be employed for actuating (opening and closing) the relief valve in the manner above set forth.

I am aware that it has heretofore been proposed to provide in connection with a steam superheater fitted to a locomotive boiler a valve device whereby, when the regulator valve controlling the supply of steam from the boiler to the superheater and engine is closed, steam can be admitted to the superheater such steam passing through the superheater pipes and escaping by means of an escape valve which is opened when the regulator valve is closed and vice versa, the steam finally escaping to atmosphere either through a pipe leading directly to the chimney or through the blower or some other device. In one arrangement heretofore proposed the above-mentioned escape valve was arranged to be opened and closed manually by means of a rod connection extending along the boiler. In other cases the escape valve has been arranged so as to be automatically opened by means of a spring or by steam pressure acting on the outer side of the valve and to be automatically closed by main steam pressure acting on the inner side of the valve when the regulator is opened so as to supply main steam to the superheater and engine. Further I am aware that in one instance it has been suggested to couple the escape valve to a regulator valve situated in a chamber on the header of the steam superheater so that when the said regulator valve closes the escape valve opens and when the regulator valve opens the escape valve closes.

What I claim as my invention and desire to secure by Letters Patent is:—

1. A superheater, a steam supply valve and a relief valve connected with the saturated and superheated steam spaces of the superheater respectively, means for operating the said supply valve, and automatically disengageable connecting mechanism arranged between the said means and the relief valve and operating the relief valve positively when connected, but otherwise permitting the supply valve to be operated to a limited extent without actuating the relief valve.

2. A superheater, a steam supply valve and a relief valve connected with the saturated and superheated steam spaces of the superheater respectively, means for opening and closing the said supply valve, and disengageable connecting mechanism arranged between the said means and the relief valve and operating positively to close the relief valve at the initial movement of the said means to open the supply valve, and also operating positively to open the relief valve at the final movement of the said means to close the supply valve, but otherwise disengaging automatically and thereby permitting the supply valve to be operated by the said means to a limited extent without actuating the relief valve.

3. A superheater, a steam supply valve and a relief valve connected with the saturated and superheated steam spaces of the superheater respectively, a lever for operating the said supply valve, means for operating the said relief valve, and articulated connections between the said lever and the said means, which connections disengage automatically during portions of the movements of the said lever, whereby the relief valve is operated positively by the said lever, and the supply valve is operated by the said lever to a limited extent without actuating the relief valve.

4. A superheater, a steam supply valve and a relief valve connected with the saturated and superheated steam spaces of the superheater respectively, a lever for operating the said supply valve, means for operating the said relief valve, a projection on the said lever, a rocker-arm pivoted adjacent to the said lever and engaged and disengaged by the said projection at predetermined points of the movements of the said lever, and intermediate connections between the said rocker-arm and the said means for operating the relief valve, whereby the relief valve is operated positively by the said lever, and the supply valve is operated by the said lever to a limited extent without actuating the relief valve.

5. A superheater, a steam supply valve and a relief valve connected with the saturated and superheated steam spaces of the superheater respectively, said relief valve being a partially balanced double-beat valve which is normally held closed with a predetermined light pressure so that it opens freely, means for operating the said supply valve, and automatically disengageable connecting mechanism arranged between the said means and the relief valve and operating the relief valve positively when connected, but otherwise permitting the supply valve to be operated to a limited extent without actuating the relief valve.

6. A superheater, a steam supply valve and a relief valve connected with the saturated and superheated steam spaces of the superheater respectively, said steam supply valve being provided with passages for connecting it with the furnace blower and arranged to permit steam to be supplied to the blower and to the said relief valve either simultaneously or separately at will, means for operating the said supply valve, and automatically disengageable connecting mechanism arranged between the said means and the relief valve and operating the relief valve positively when connected, but otherwise permitting the supply valve to be operated to a limited extent without actuating the relief valve.

In testimony whereof I have affixed my signature, in presence of two witnesses.

JOHN GEORGE ROBINSON.

Witnesses:
  EUSTACE H. BARKER,
  C. GROVES.

Copies of this patent may be obtained for five cents each, by addressing the "Commissioner of Patents, Washington, D. C."